Patented Aug. 27, 1929.

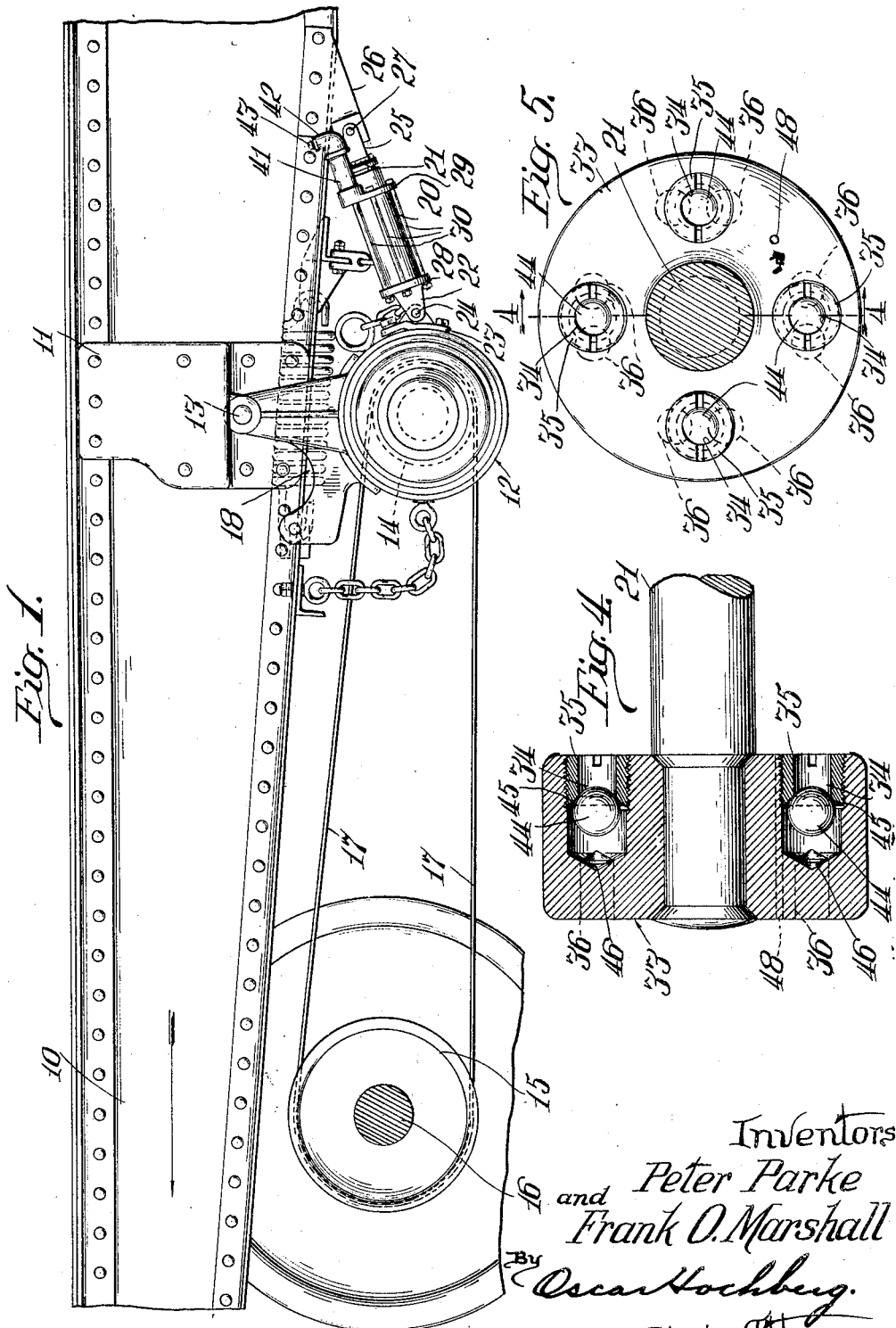

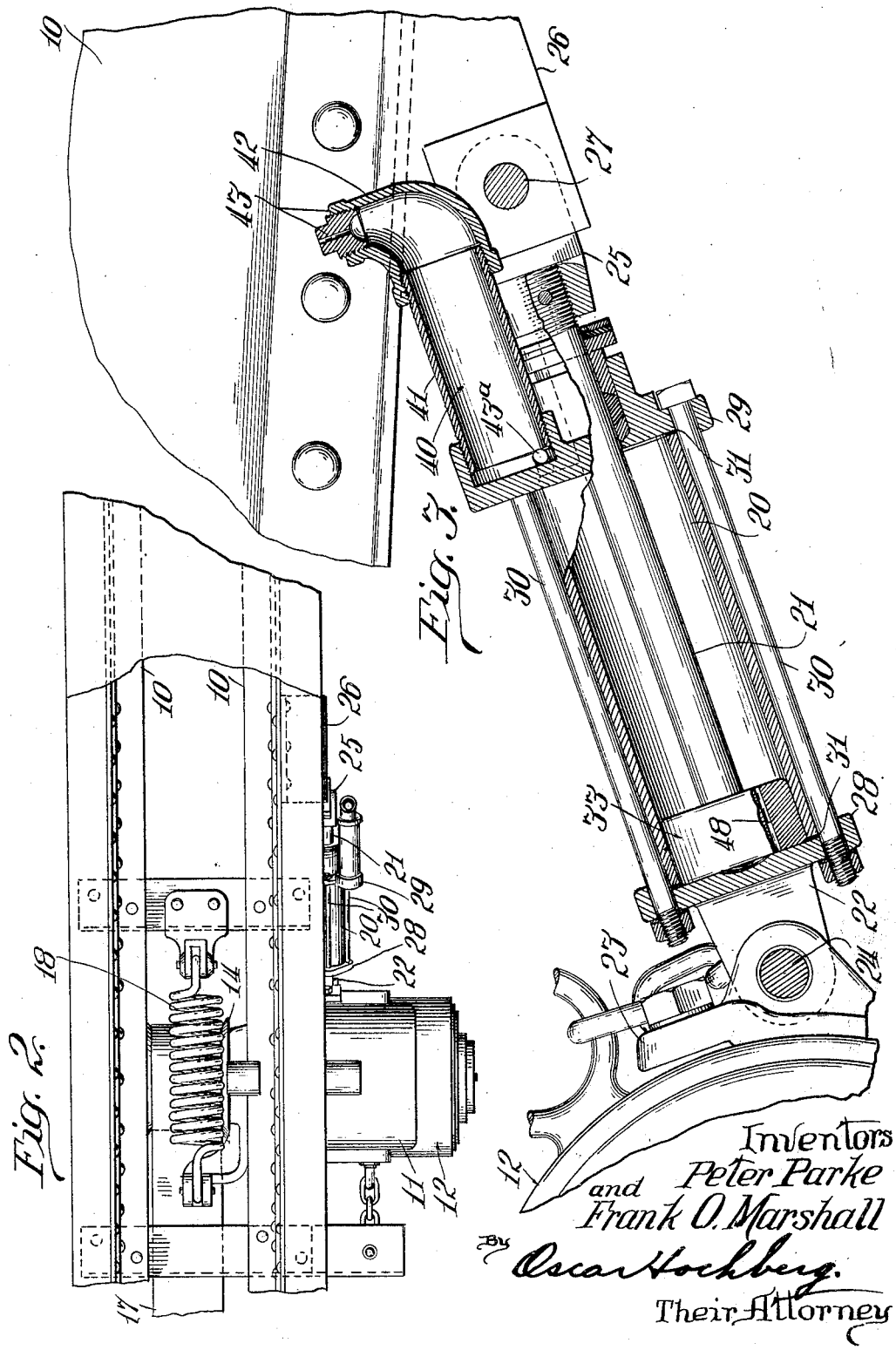

1,725,824

UNITED STATES PATENT OFFICE.

PETER PARKE AND FRANK O. MARSHALL, OF CHICAGO, ILLINOIS, ASSIGNORS TO THE PULLMAN COMPANY, OF CHICAGO, ILLINOIS, A CORPORATION OF ILLINOIS.

GENERATOR SUSPENSION APPARATUS.

Application filed February 6, 1928. Serial No. 252,411.

The invention relates generally to railway car lighting systems employing a generator pivotally suspended from the car body and driven by means of a belt connecting the generator to a driving truck axle, and particularly to apparatus for relieving the belt of the disrupting blows of the generator pulley during car movement. More specifically, the invention contemplates the dampening of generator movement in a direction tending to increase the pull upon the belt and a comparative freedom of movement in the opposite direction for a purpose hereinafter outlined.

When a pivotally mounted generator, suspended from the car body and yieldingly held by a belt tensioning spring, moves in a direction tending to relieve the pressure on the belt, it does so primarily under forces tending to overcome the inertia of the generator and resistance of the spring; such forces result usually from an emergency brake application of a rapidly moving train and during car switching operations, and in a lesser degree may be traced to the surging and lagging movements of the several cars making up the train. The reaction to the forces thus generated is effective during the return movement of the generator under stress of the tension spring, to cause the generator to swing beyond its normal suspended position until checked by the belt.

If the belt does not fail under the severe initial impact of the generator pulley, the force of the blow is usually sufficient to cause the swift rebound of the generator and further subject the belt to additional blows before the energy of the force applied is spent. The repeated straining of the belt under the application of forces communicated by the vibrating generator results in the abnormal stressing of the belt fastening and premature failure of the belt assembly.

To avoid the shocks incident to the sudden checking of generator movement by the belt structure and resultant abnormal pressures built up and transmitted throughout the generator assembly, it becomes necessary to retard the movements of the generator in a direction away from the truck to absorb the energy of the moving generator body before it can be checked by the belt, and it is to the accomplishment of this purpose that the invention is directed.

It is therefore the principal object of the invention to relieve the belt of abnormal pressures by mechanism affording a yielding resistance to the generator body in one direction of movement and permitting a relatively free movement thereof in the opposite direction.

A further object is to provide means arranged to absorb the energy of generator movement by mechanism independent of the belt and designed to retard the travel of the generator body in one direction of its movement.

Other and important objects are attained by the mechanism illustrated in the accompanying drawings, in which:—

Fig. 1 is a side elevational view of the generator assembly as applied to the underframe of a railway car, showing a preferred embodiment of the invention;

Fig. 2 is a plan view of the generator assembly showing the application of the invention to existing mechanisms and indicating the relation of the several parts;

Fig. 3 is an enlarged fragmentary view in partial elevation and longitudinal section showing the graduated resistance mechanism used in the present embodiment of the invention;

Fig. 4 is a vertical sectional view taken on line 4—4 of Fig. 5 showing the piston head and check valve arrangement forming part of the resistance mechanism; and Fig. 5 is a view in elevation of the upper face of the piston head showing the disposition of the liquid outlet port openings.

In the drawings, 10 represents the center sill of a car body underframe to which is secured a generator suspension bracket 11 from which a generator 12 is pivotally suspended by means of a supporting pin 13 journalled in the bracket. The generator is fitted with the usual pulley 14 operatively connected with a driving pulley 15 on axle 16 by an endless belt 17 held in tension by means of the usual spring 18 anchored at one end to the underframe 10 and secured at its opposite end to the generator 12 and yieldable in response to the movements of the driving pulley 15 and resultant vibrations of the generator 12, as will be understood.

Associated with the generator assembly above outlined is the resistance mechanism constituting the present embodiment of the invention. The embodiment involves the use of a dash-pot arrangement for controlling the return movements of the generator 12 under stress of belt tensioning spring 18, and comprises a plunger cylinder 20 and contained plunger 21 and together providing a thrust connection between the generator and a fixed part of the car body. As indicated in the drawing, the jaw 22 fixed to one end of the dash-pot cylinder 20 is coupled to bracket jaws 23 on the generator by pin 24 for anchoring the movable end of the dash-pot, and the clevis 25 on plunger 21 secured to a bracket 26 on the underframe 10 by means of pin 27 for anchoring the relatively fixed end of the dash-pot assembly to the car body.

The dash-pot assembly comprises the plunger cylinder 20 proper fitted with a securing head 28 at the generator end and a stuffing box head 29 at the opposite end for guiding the plunger rod 21, both heads being held to the cylinder 20 by connecting bolts 30, gaskets 31 being introduced between the heads and ends of the cylinder to insure fluid-tight joints at these points.

Rigidly mounted upon the plunger rod 21 is a piston head 33 having outlet ports 34 closed by one-way valves 35 and having branch ports 36 all designed to permit the free passage of liquid in one direction of movement and check the flow in the opposite direction to control the sliding movement of the cylinder 20 upon the plunger 21.

To insure a sufficient operating head of liquid within the cylinder 20 at all times and at once prevent the formation of air pockets, the liquid volume is maintained by means of an auxiliary body of liquid held in a reserve chamber 40 arranged at a level relatively higher than cylinder 20 and containing a sufficient quantity of liquid to exclude air from the cylinder. The liquid reserve chamber 40 may be made integral with the stuffing box head 29 but is preferably formed separately of a pipe section 41 tapped into the head 29 and fitted at its opposite end with an elbow section 42 having an opening closed by a vented plug 43 removable for the purpose of charging the cylinder with liquid, as best shown in Fig. 3 of the drawings. Communication between cylinder 20 and reserve chamber 40 is established by means of a duct 43$^a$ in stuffing box head 29 to provide a constant supply of liquid to the cylinder.

The one-way valve mechanism 35 in the piston head may be of any approved design, that indicated in the drawings being of the ball check type in which the ball members 44 are forced against their respective seats 45 at ports 34 by the pressure of the liquid entering the ball chamber through branch ports 36 to check the flow of liquid thru ports 34 in one direction of cylinder movement; in the opposite direction of cylinder movement the liquid moves freely through ports 34 and 36 due to the shifting of the ball members against opposite seats 46 between the respective pairs of branch ports 36 and away from ports 34 under pressure of the relatively rapid flow of the liquid. Since the liquid flow through the valves is initiated by cylinder movement, it follows that the movements of the cylinder, and thru it the generator, will be controlled by the rate of flow of the liquid at the piston head. The unrestricted flow of liquid thru all of the ports will permit the free forward movement of the cylinder 20 and connected generator 12, but the return movement of the cylinder will be governed by the return flow of the liquid to the opposite side of the piston head and thru channels other than the port openings aforesaid. Under pressure originating at the generator and communicated to the liquid thru the medium of the cylinder 20, the speed of the return movement of the generator and cylinder will be proportioned to the extent of the leakage at the piston head.

Experience with the device has demonstrated that the relatively small leakage between the piston head and cylinder walls is not alone sufficient to permit the return of the generator quickly enough to avoid belt slippage. As it is desirable to maintain a sliding fit between the piston and cylinder walls and deemed advisable to control the return flow of the liquid by means other than the clearance between piston head periphery and cylinder walls, small by-pass openings 48 are drilled thru the piston head 33 to facilitate the return flow of the liquid to further reduce the resistance to generator return movement, such holes being of a size and number commensurate with the weight of the generator employed. It will be noted that the parts entering into the generator assembly and associated dash-pot structure have been so co-ordinated that the expansion of the resistance mechanism connecting the generator and car body will permit a free one-way movement of the generator, while the opposite movement of the generator will be retarded during the relatively slow transfer of liquid from the under to the upper side of piston head 33 under pressure from the advancing cylinder 20.

In response to the normal changes in the position of the truck or to forces due to sudden changes in train speeds, it is important that the generator be retarded in its movements only in the direction tending to increase the pull on the belt, and have a relatively free movement in the opposite direction, regardless of the direction of car movement. It would be impracticable to retard the movements of the generator in both directions owing to the tendency of the generator pulley to lag under the resistance to generator movement originating in the dash-pot. The generator pulley would be unable to respond quickly enough to the swiveling of the car truck when moving rapidly over curves, thus increasing the distance between pulley centers and unduly straining the belt.

In operation, and assuming the car equipped with the invention to be running in the direction indicated by the arrow in Fig. 1, upon an emergency application of the brakes or sudden stoppage of the car due to impact, the generator will swing towards the truck under its own momentum, carrying with it the fluid cylinder 20 of the dash-pot; the cylinder will slide freely upon the piston head 33 and rod 21 unhampered by the flow of liquid above the piston head thru the open ports 34 and 36 into the rapidly expanding chamber beneath. This movement will continue until checked by the belt tensioning spring 18 and the weight of the generator, whereupon resistance to return movement is immediately encountered and the combined thrust of the generator and stored energy of the distorted belt tensioning spring is exerted to move cylinder 20 against the liquid column within the chamber beneath the piston head 33. The cylinder will move upon the piston at a speed proportioned to the pressure on the liquid column, and the rate of leakage past the piston head at the cylinder walls and thru by-pass openings 48. The pressure upon the liquid column will tend to force the liquid thru ports 36 and 34 but the flow of the liquid will carry the valve ball members 44 against their respective seats 45 to close ports 34. With the ports thus closed to the passage of liquid to the now expanding upper chamber the return speed of the generator will be retarded by the relatively slow transfer of liquid to the chamber above the piston head thru the channels as described.

Because of the relatively slow return movement of the generator the belt will be relieved of all pressure in excess of that required to prevent belt slippage as before explained, all thrusts of the generator pulley being absorbed before they can be transmitted to the belt. By virtue of the self-contained character of the resistance mechanism herein disclosed, the application of the retarding feature to existing generator suspension assemblies may be effected with a minimum expenditure of time, labor, and materials, and without disturbing the installations now on the cars.

The operation of the mechanism has been described with reference to the movement of the car in the direction indicated by the location of the truck carrying the driving pulley or in the forward direction. Obviously, the operation of the mechanism is the same during the movement of the car in the opposite direction except for the sequence and direction of retarded generator movement; that is to say, the generator movement in a direction tending to increase the pressure on the belt will be dampened directly upon a sudden reduction in train speed while the return movement to normal suspended position will be comparatively free, leaving the generator free to respond to the pull on the pulley belt as before.

We claim:—

1. In a railway car generator assembly including a belt driven generator pivotally hung from the car body and operatively connected to a car truck, retarding mechanism connecting the car body and generator and adapted to oppose said generator in one direction of its movement, and means carried by said mechanism for permitting relative freedom of movement in the opposite direction.

2. A railway car generator assembly comprising a belt driven generator pivotally hung from the car body and operatively connected to a car truck, and means permitting free movement of said generator in one direction and oppose generator movement in the opposite direction.

3. A railway car generator assembly comprising a belt driven generator pivotally hung from the car body and operatively connected to a car truck, a belt tensioning device, and mechanism permitting free movement of said generator in one direction and effective to oppose said tensioning means upon the return movement of said generator.

4. A railway car generator assembly comprising a belt driven generator pivotally hung from the car body and operatively connected to a car truck, a belt tensioning device, and separate mechanism connecting said generator and car body and adapted to oppose said tensioning means in one direction of generator movement and to permit relative freedom of movement of the tensioning device during generator movement in the opposite direction.

5. A railway car generator assembly comprising a belt driven generator pivotally hung from the car body and operatively connected to a car truck, a belt tensioning device, and dash-pot mechanism connecting said car body and generator and effective to oppose said tensioning device in but one direction of generator movement.

6. A railway car generator assembly comprising a belt driven generator pivotally hung from the car body and operatively connected to a car truck, a belt tensioning device, and means operable in but one direction of generator movement to oppose said tensioning device.

7. A railway car generator assembly comprising a belt driven generator pivotally hung from the car body and operatively connected to a car truck, a belt tensioning spring mechanism and fluid means operable in but one direction of generator movement to oppose said tensioning means.

8. A railway car generator assembly comprising a belt driven generator pivotally hung from the car body and adapted to swing freely in but one direction in response to the swiveling movements of the car truck, a belt tensioning spring device, and means operable in the opposite direction of generator movement to oppose said tensioning spring.

9. A railway car generator assembly comprising a belt driven generator pivotally hung from the car body and adapted to swing freely in but one direction in response to the movements of the car truck, a belt tensioning device, and retarding means operable in the opposite direction of generator movement to oppose said tensioning means, said retarding mechanism providing a flexible connection between said generator and car body.

10. A railway car generator assembly comprising a belt driven generator pivotally hung from the car body and operatively connected to a car truck, a belt tensioning spring, and means independently of the spring for retaining generator movement in a direction tending to increase the tension on the belt and permit a relatively free movement of the generator in the opposite direction.

11. In a dash-pot arrangement for pivotally hung generators of railway cars, the combination comprising a piston element pivotally anchored to the car body, a cylinder slidably mounted upon said piston and pivotally secured to and movable with said generator, and valve means carried by said piston and operable by said cylinder to oppose the generator in but one direction of its movement.

In witness whereof we have hereunto set our hands this 24th day of January, 1928.

PETER PARKE.
FRANK O. MARSHALL.

CERTIFICATE OF CORRECTION.

Patent No. 1,725,824.  Granted August 27, 1929, to

PETER PARKE ET AL.

It is hereby certified that error appears in the printed specification of the above numbered patent requiring correction as follows: Page 4, line 23, claim 10, for the word "retaining" read "retarding"; and that the said Letters Patent should be read with this correction therein that the same may conform to the record of the case in the Patent Office.

Signed and sealed this 1st day of October, A. D. 1929.

(Seal)

M. J. Moore,
Acting Commissioner of Patents.